July 29, 1969

R. W. SYKES ET AL 3,457,803

EXTENDIBLE BICYCLE PEDAL INCORPORATING
IMPROVED GRIPPING APPARATUS

Filed Feb. 23, 1968

Charles A. Toce
Richard W. Sykes
Jessie T. Sykes
INVENTORS

BY Donald Gunn

ATTORNEY

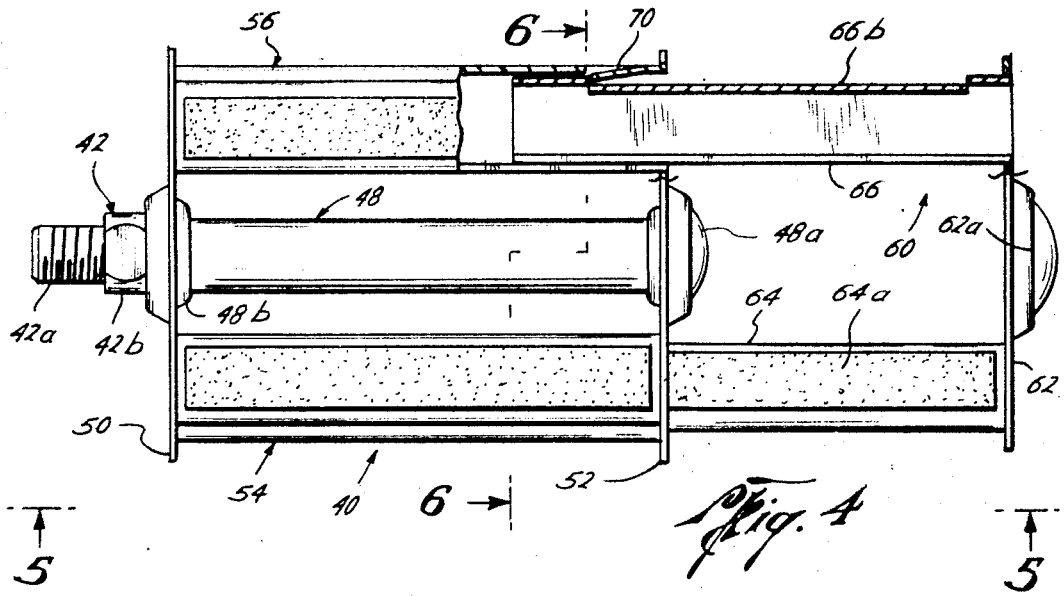
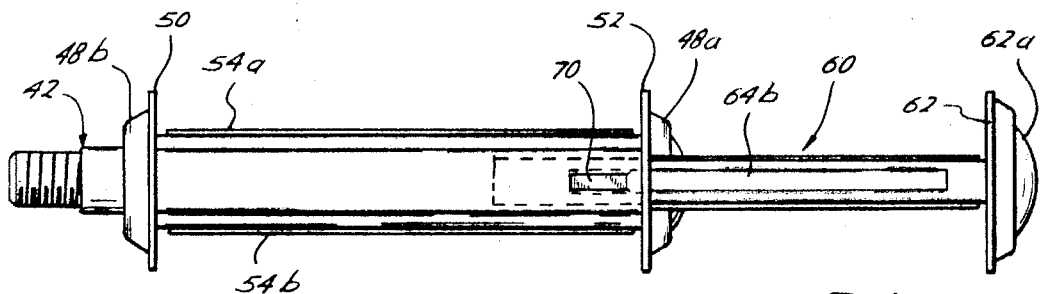
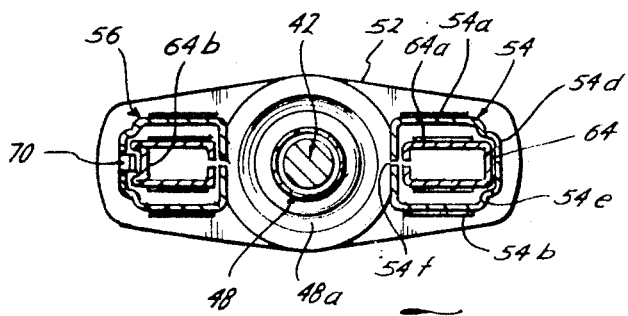

United States Patent Office 3,457,803
Patented July 29, 1969

3,457,803
EXTENDIBLE BICYCLE PEDAL INCORPORATING IMPROVED GRIPPING APPARATUS
Richard W. Sykes and Jessie T. Sykes, both of 1244B Flater Lane, Lake Charles, La. 70601, and Charles A. Toce, Lake Charles, La.; said Toce assignor to said Richard W. Sykes and said Jessie T. Sykes
Filed Feb. 23, 1968, Ser. No. 707,578
Int. Cl. G05g 1/16
U.S. Cl. 74—594.7    10 Claims

ABSTRACT OF THE DISCLOSURE

An extendible bicycle pedal for receiving the feet of two bicycle riders, preferably including a conventional axial shaft having support brackets at each end thereof, foot supports on each side of the axial shaft and presenting preferably identical upper and lower surfaces having widely spaced and substantially supported contact surfaces, an extendible pedal portion moving from a locked and recessed position to an extended and locked position whereby similar load bearing surfaces of wide placement and wide surface area are presented, the extended portion receiving the foot of the second rider thereon.

RELATED APPLICATIONS

The present disclosure is assigned to the inventors of presently pending application Ser. No. 620,783, filed Mar. 6, 1967, said application having been filed during the pendency of U.S. Patent No. 3,307,425, which was issued on Mar. 7, 1967.

SUMMARY OF PROBLEM AND INVENTION

Bicycle riding has in recent years become an increasingly popular activity for leisure, and particularly for those other than children. The marked increase in popularity has been accompanied by the reluctance of many people to travel alone, and because of this, bicycles intended for multiple parties or riders are becoming increasingly popular. As described in the above noted U.S. patent, quite often riders prefer to ride double, sharing the moderate exercise required of the riders. With this in view, the above noted U.S. patent provides one form of foot pedal permitting the application of motive power to the bicycle by both of the riders thereon, it being noted and understood that the subject matter of said patent and said co-pending disclosure discloses substantial and workable structures which are quite satisfactory in operation.

The subject matter of the present invention particularly incorporates an enlarged or enhanced surface presented to the foot of the rider to increase his traction on engaging the pedal, and to further reduce the possibility or likelihood that the foot of either or both riders should slip from the pedal. It is with the general use for dual riders on bicycles in view that the present invention is summarized as incorporating a conventional axial shaft and rotatable sleeve having joined thereto a pair of outwardly extended mounting brackets which carry two hollow foot supports, said foot supports being on both sides of the shaft, and incorporating a frictional surface, both upper and lower sides, so that the foot of the rider is substantially supported on the widely spaced areas to thereby adequately frictionally engage the foot of the rider, and wherein the extendible portion of the pedal is likewise constructed and arranged, being slightly smaller in size, to permit telescoping movement from its extended position to a nested position within the fixed foot supports used by the first rider. With the above summary in view, it is therefore an object of the present invention to provide a new and improved extendible foot pedal, providing contact against the feet of both riders, all four feet placed on a pair of substantially widely contacted surfaces.

Another object of the present invention is to provide a new and improved extendible bicycle pedal with construction presenting broad surfaces of contact to the feet of the riders for increased traction and safety whereby abrasive surface means are brought in substantial contact with the feet of both riders.

An important object of the present invention is to provide a new and improved extendible bicycle pedal wherein the foot support portions thereof are fabricated of sheet stock and not tubular members, to enhance the method of construction with the added improvement in structural reliability and frictional engagement with the foot of the rider.

Other objects and advantages of the present invention will become more readily apparent from a consideration of the specification and drawings, wherein:

FIG. 4 is an elevational view of the bicycle pedal of the present invention shown extended and with a portion of one side broken away and shown in sections;

FIG. 5 is a sectional view taken along the line 5—5 of FIG. 4 illustrating details of the means for locking the pedal in the extended position; and, FIG. 6 is a sectional view taken along the line 6—6 of FIG. 4 illustrating additional details of construction.

Figure 1:
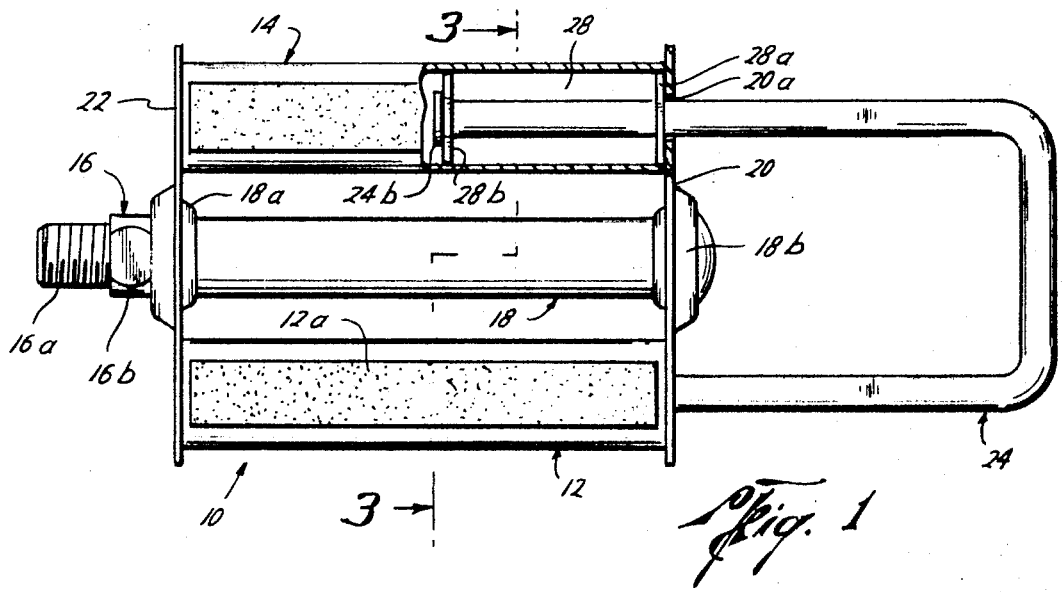
FIG. 1 is an elevational view of one embodiment of the bicycle pedal of the present invention shown extended and with a portion of one side broken away to show internal details of construction.

Attention is first directed to FIG. 1 of the drawings which illustrates a bicycle pedal indicated generally by the numeral 10. The bicycle pedal 10, which is illustrated in detail in FIGS. 1–3, inclusive, includes a pair of preferably identical foot support members indicated at 12 and 14 which provide suitable opposite side surfaces adapted to receive the foot of a first user thereon in a conventional manner. The foot support members are spaced on opposite sides of a longitudinally extending shaft indicated by the numeral 16, the shaft 16 extending into and generally encompassed by a closed, tubular housing 18 as shown in the drawings. The housing 18 carries an outboard bracket 20 and an inboard support bracket 22, the brackets 20 and 22 extending adjacent the foot support members 12 and 14 at opposite ends to form a suitable structure wherein the rider's weight is transferred to the central shaft 16. An extendible portion indicated generally by the numeral 24 comprises the subject matter of the present invention and is particularly adapted to receive the foot of the second rider thereon with a view of permitting comfortable, dual use of the present device. As will be described in greater detail hereinafter, the means of the present invention is particularly adapted to permit dual use of the conventional bicycle structure in general through the adaptation of the present invention.

Considering the invention more in detail, FIG. 1 illustrates the shaft 16 as including a threaded shank 16a which is adapted to be threaded into the sprocket of a bicycle in a conventional manner. An integrally formed enlargement 16b on the shaft 16 provides suitable wrench flats to ease installation of the new and improved bicycle pedal 10 of the present invention. The flats are engaged in a conventional manner to thread the shank 16a into the sprocket. Of course, it will be appreciated that the provision of a conventional pair of identical pedals for all bicycles involves oppositely directed threads on each of the pedals of the pair whereby one is threaded to the left and the other to the right.

The tubular member 18 has a longitudinal extent approximating that of the foot support portions 12 and 14. The tubular member 18 at its inner or inboard end incorporates a bearing housing 18a of sufficient size and diameter to receive a suitable bearing whereby relative rotation between the tubular housing 18 and its connected structure is accomplished with respect to the shaft 16. The housing 18a will be noted in the drawings as an enlargement on both sides of the transverse member comprising the mounting bracket 22. Since this assembly is generally siimlar to that found in structures of the prior art, including conventional bicycle pedals, it is believed that additional details are not necessary.

The opposite or outer end of the tubular housing 18 terminates in an enlargement indicated at 18b. The enlargement 18b is likewise connected to the transversely extending bracket 20. The housing 18b encompasses an additional bearing rotating about the outer end of the shaft 16. By the use of the two bearings (not shown), smooth and friction-free relative rotation of the pedal is obtained to transfer the torque provided by the rider without substantial loss to the sprocket.

The foot support members 12 and 14 are preferably identical in construction. Each is joined at its end portions to the transversely extending cross braces 20 and 22 as shown in the drawings. Preferably, the foot support members 12 and 14 (see FIG. 3) are rectangular and approximately square. The support members are extruded or, in the alternative, are preferably formed of sheet stock to define the cross section shown. Of particular interest, it will be noted that both the upper and lower surfaces include an abrasive material indicated by the numerals 12a and 12b. The material provides an abrasive and slip-resistant surface preferably formed on an adhesive backing with a grit or other course material forming the outer surface for frictional engagement of the feet of a bicycle rider. The grit material is preferably located along the full length of the foot support members 12 and 14 as shown in FIG. 1, and is on both sides of the support members, it being appreciated that the pedal 10 is easily inverted and either major surface may serve as the foot support surface. Materials suitable for use as the grit and backing means are known to those skilled in the art.

Figure 2:
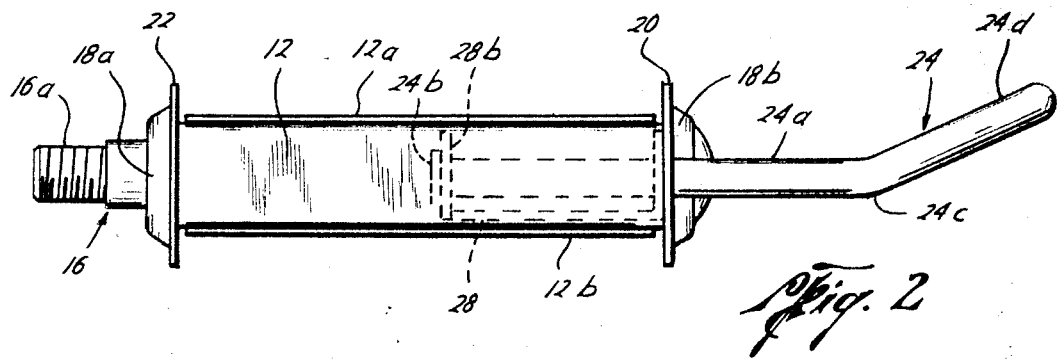
FIG. 2 is a side view of the structure shown in FIG. 1 showing the bicycle pedal in an extended position and showing internal details of construction.
Figure 3:
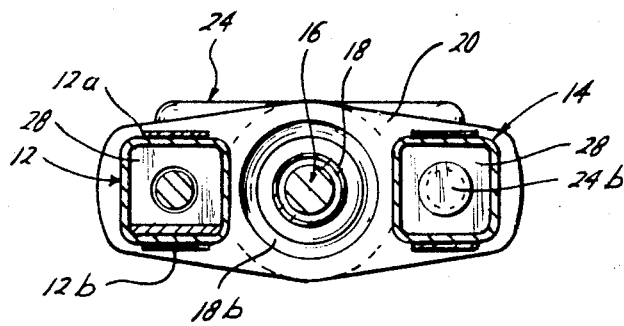
FIG. 3 is a sectional view taken along the line 3—3 of FIG. 1 illustrating internal supports for the extendible portion for permitting sliding movement to the extended position.

Of particular interest to the present invention is the rectangular configuration of the foot support members 12 and 14. The hollow, central portion of the foot support members is used to receive a support bracket indicated by the numeral 28 in FIG. 1. The bracket is U-shaped as shown in dotted line in FIG. 2, and includes a pair of upstanding members 28a and 28b. The upstanding members have central openings which are aligned with an opening 20a in the transversely extending brace 20 for supporting the extendible pedal portion 24. More particularly, FIG. 2 illustrates the fact that the extendible pedal portion 24 is comprised of a substantially long slidable portion 24a extending to an enlargement 24b which locks the pedal means 24 in position with respect to the support bracket 28. It will be appreciated that symmetrically identical brackets are found in both foot support members 12 and 14.

The U-shaped brackets 28 have a total span of somewhat greater than one inch to define two spaced bearing points whereby the loading on the extendible portion 24 is reacted against the brackets 28 which support the means 24 in the extended position. The spaced upright members 28a and 28b maintain suitable alignment of the means 24 in the extended or retracted position and guide the means 24 as the pedal is retracted or extended. Since the bracket means 28 essentially fills the internal structure, little play is permitted to the extendible portion 24 so that it is difficult, if not impossible, to have misalignment of the various parts of the means 10.

In the extended position, it will be noted that the upstanding portions 28a of the brackets 28 slide against and abut the transversely extending bracket 20. This determines the outer extent of movement as shown in FIGS. 1 and 2. On retraction of the extendible portion, the upstanding end member 28b of the bracket 28 abuts the transversely extending portion 22 to determine the extremity of movement of the support means 24. As a consequence, suitable stop means are provided for determining the movement of the extendible portion 24.

It should be noted that the means 24 is provided with a slight bend at 24c as shown in FIG. 2 wherein a slightly uplifted or raised portion 24d extends at an angle. The angular portion prevents the foot of the second rider from sliding off the outer end of the pedal. It will be appreciated that the bracket 20 which extends transversely of the pedal protrudes above the surface means to prevent the foot of the first rider from sliding outwardly of the pedal. This feature is also made available to the second rider by the provision of the upturned portion 24d as shown in the drawing.

Attention is next directed to FIGS. 4, 5 and 6 of the drawings which illustrate a second alternative embodiment indicated generally by the numeral 40. The embodiment 40 incorporates a central shaft 42 which is received in a tubular housing indicated generally at 48. The shaft 42 is similar to the shaft 16 shown in FIGS. 1–3, inclusive, wherein it incorporates a threaded end portion 42a, an enlargement 42b incorporating wrench flats, and an elongate portion received within the housing 48. The housing 48 extends the full length of the pedal 40 and terminates in the bearing housing 48a in which is received a bearing assembly about the shaft 42 and which is similar to a second bearing assembly placed in the second bearing housing 48b. The two bearing assemblies cooperate together to provide smooth and friction-free location of the pedal 48 with respect to the non-rotatable shaft 42.

The pedal 40 incorporates transversely extending brackets 50 and 52. The brackets connect to the tubular housing 48 at the circular enlargements 48a and 48b. The transversely extending brackets provide structural support for the spaced foot support members 54 and 56. The foot support members of the embodiment 40 are of particular interest. They incorporate conventional upper and lower surfaces which are used interchangeably and on which are located the friction or engaging surface means 54a and 54b as shown in FIG. 5. It will be understood that the surface coating material 54a and 54b are preferably grip or other abrasive material bonded or joined to a pliable or flexible base member which is then secured by suitable adhesive such as an epoxy, to the foot support members 54 and 56. The foot support members are thus formed to present a flat surface to the foot of the rider which is frictionally engaged to prevent the foot of the rider from slipping from the bicycle pedal 40.

The foot support members 54 and 56 are preferably formed of sheet stock which is specially shaped as shown in FIG. 6 in the cross-section view. Attention is particularly directed to the foot support member shown in FIG. 6 wherein a side bead 54d is adapted to receive the extendible portion to be described. The foot support member is strengthened or reinforced at the corners such as 54e to increase its strength against bending and is further formed into the approximate shape of a rectangle or square by forming the remaining sides of the stock to define the hollow member. It will be noted that a gap is left at closure, there being no purpose in joining the two abutting portions at 54f since the illustrated structure is quite adequate in strength and integrity.

Attention is next directed to the extendible portion of the pedal means 40 which is indicated generally by the numeral 60. The means 60 includes a transversely extending structural bracket 62 which is adapted to support each of a pair of foot support members 64 and 66. The members 64 and 66 telescope within the foot support members 54 and 56, respectively. The members 64 and 66 are joined to the transverse means 62 by suitable means such as welding, swedging, upsetting, or the like. The bracket 62 preferably has a transverse extent approximately equal to the bracket 52 found inwardly of the extendible bicycle pedal 60. The bracket 62 likewise has an enlarged portion 62a which is shaped to nest with and against the bearing housing 48a when in the retracted position. In the extended position as shown in the drawings, suitable space between the transverse supports 52 and 62 receives the foot of the second rider on the support members 64 and 66.

The foot supports 64 and 66 are formed with a rectangular cross section as shown in FIG. 6. Therein, it will be noted that sheet stock is again formed into the rectangular shape with an open seam running along one edge, it being noted that the structure is quite stout and strong and will easily support the load of the second rider. The foot support member 64 further incorporates on both surfaces the grit material indicated by the numeral 64a in FIG. 4 which extends essentially along the full length of the surface exposed for the foot of the second rider. That is, the grit and backing material which increases the frictional engagement of the rider extends from the transverse bracket 62 to a point within the housing defined within the foot support member 54 when extended as shown in FIG. 4. The grit material 64a is preferably similar to the material provided elsewhere on the bicycle pedal means 40.

The foot support means 64 is shown in side view in FIG. 5 wherein a longitudinally extending slot is formed in 64b. The slot is formed by an indentation as shown in FIG. 6 wherein the edges of the rectangular structure adjacent to the slot are bent twice over to increase the strength of the structure against bending and to also form a receptacle for a lock means 70. The means 70 is more particularly shown in FIGS. 4 and 5 as a long metal tab formed by a U-shaped cut in the outer wall of the foot support members 54 and 56. The lock means 70 is slightly bent to position its free end in the lock slot means 64b shown in FIG. 5. FIG. 4 illustrates the full longitudinal extent of the slot means 66b and shows the lock means 70 abutting the inward termination of the slot means where the change in contour forms a suitable abutting shoulder for the lock means to prevent pulling the extendible means 60 from the bicycle pedal proper. It will be appreciated that the locked extension is then extended to a position suitable for receiving the foot of the second rider. The retracted position of the portion 60 is limited in movement by abutting the transverse member 62 against the member 52, it being noted that the lock means 70 extends into the slots 64b and 66b without engaging the shoulder at the outer end of the slot means.

Of particular interest to the embodiment 40 shown in FIGS. 4–6, inclusive, is the fact that the components thereof are easily formed of sheet stock. The use of sheet stock in the foot support members, both conventional and the extendible members, defines a structure that is not only relatively inexpensive to fabricate, but which is also appropriately shaped to provide a stout structure able to support the weight of both riders. Moreover, it will be noted that the locking means herein provided is suitably adapted for a telescoping extendible pedal which uniquely presents surfaces which engage the foot of both riders enhanced by improved frictional engagement through the use of the grip material previously described. The abrasive surfaces presented for both riders substantially increase the safety of the present invention when in use.

While numerous alternatives could be noted with regard to the present invention, the scope of the present invention is determined by the claims appended hereto, of which the foregoing two structures disclose two alternative preferred embodiments.

What is claimed is:

1. A bicycle pedal adapted to be used with an extendible pedal portion for receiving the foot of a second rider thereon wherein the extendible portion telescopes within the pedal, comprising:
    (a) a pair of foot support members, each of said members being of generally hollow construction, and having a generally rectangular cross section having upper and lower surfaces of an interchangeable nature to permit the use of either surfaces to support the feet of a rider thereon;
    (b) frictional engaging material means joined to the upper and lower surfaces of said foot support means for engaging the feet of a rider;
    (c) said foot support means being supported by transversely extending brackets, one of which is the outer bracket and has an opening means therein in communication with the hollow portion of said foot support means and through which an extendible portion is slidably mounted and retractable pedal portion moves;
    (d) said foot support means including stop means for limiting the movement of the extendible portion to inwardly retracted position and an outwardly extended position, said stop means utilizing the outer transverse bracket for limiting the movement to the outwardly extended position.

2. The invention of claim 1 wherein said foot support members include a generally rectangular cross section formed of sheet stock to define a closure seam etxending the length of said support members and wherein said flat stock is constructed and arranged to form a multiple walled elongate means extending between a pair of transversely extending brackets.

3. The invention of claim 1 wherein said extendible portion includes a generally U-shaped member of generally circular cross section and having a pair of elongate portions slidably movable through the outer bracket and being supported on a means movable within said hollow foot support members.

4. The invention of claim 3 wherein said extendible portion includes an upturned portion at the end of said elongate portions.

5. The invention of claim 3 including a generally U-shaped means carried on said elongate portions having upstanding members conforming to the internal shape and contour of said foot support members, said U-shaped means having slidable movement within said foot support members to abut said upstanding members at each of two extremes of movement.

6. The invention of claim 1 wherein said extendible portion includes a pair of foot support members of generally rectangular shape, said foot support members conforming to said first foot support member of hollow construction and slidable positioned therein.

7. The invention of claim 6 including a transversely located bracket connected to said second foot support members and having a construction adapted to nest with and against a transversely extending bracket carried at the outer end of said first foot support member on retraction and movable therefrom on extension.

8. The invention of claim 6 including slide lock slot means on said second foot support means for cooperation with a lock means to define an extended position, a retracted position and a path of movement for said extendible pedal portion.

9. The invention of claim 6 wherein said second foot support means is formed of flat stock to define a generally flat upper and lower surface means for receiving the foot of a user thereon.

10. The invention of claim 9 wherein said upper and lower surfaces are covered with a gripping means.

References Cited

UNITED STATES PATENTS

| 2,337,246 | 12/1943 | Kelly | 74—594.7 |
| 2,706,418 | 4/1955 | Liljenberg | 74—594.4 |

FRED C. MATTERN, Jr., Primary Examiner

F. D. SHOEMAKER, Assistant Examiner